United States Patent
Glickman

(10) Patent No.: US 8,422,949 B1
(45) Date of Patent: Apr. 16, 2013

(54) PUBLIC KIOSK PROVIDING NEAR FIELD COMMUNICATION SERVICES

(75) Inventor: Seth Isaac Glickman, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/472,441

(22) Filed: May 15, 2012

Related U.S. Application Data

(63) Continuation of application No. 13/245,503, filed on Sep. 26, 2011, now Pat. No. 8,180,289.

(51) Int. Cl.
*H04B 5/00* (2006.01)

(52) U.S. Cl.
USPC ....... 455/41.1; 455/41.2; 455/552.1; 705/310

(58) Field of Classification Search .......... 455/41.1, 455/41.2, 552.1; 705/310
See application file for complete search history.

(56) References Cited

U.S. PATENT DOCUMENTS

| | | | |
|---|---|---|---|
| 2010/0190437 A1* | 7/2010 | Buhot | 455/41.1 |
| 2010/0211217 A1* | 8/2010 | Hirsh et al. | 700/234 |
| 2011/0131660 A1* | 6/2011 | Claessen et al. | 726/26 |

\* cited by examiner

*Primary Examiner* — Tuan H Nguyen
(74) *Attorney, Agent, or Firm* — Young Basile Hanlon & MacFarlane P.C.

(57) ABSTRACT

Systems and methods are disclosed for making content elements available for use at a public computing kiosk operated by a first-party operator. The public computing kiosk can receive a wireless communication from a hand-held device utilized by a second-party end user located in close physical proximity to the public computing kiosk. The wireless communication can include information identifying a third-party provider of the hand-held device with the third-party provider and the first-party operator being different entities. The public computing kiosk can transmit a request to a computing system including information identifying the third-party provider of the hand-held device, receive a transmission including a set of content descriptors, and display the set of content descriptors to the second-party end user. The public computing kiosk can also accept selection of content descriptors and execute at least one content element corresponding to at least one content descriptor.

20 Claims, 3 Drawing Sheets

PUBLIC KIOSK PROVIDING NEAR FIELD COMMUNICATION SERVICES

RELATED APPLICATIONS

This application is a continuation of co-pending U.S. patent application Ser. No. 13/245,503 filed Sep. 26, 2011, the disclosure of which is hereby incorporated by reference in its entirety.

TECHNICAL FIELD

The disclosed subject matter relates in general to Near Field Communication (NFC) services and in particular to public kiosks providing NFC services.

BACKGROUND OF THE INVENTION

NFC enables short-range, contactless, wireless communication between various devices, for example, mobile telephones, service terminals, or kiosks and NFC-compatible stickers, fobs, cards, or tags. NFC requires at least two devices, a first device having a medium for storing data and a second device having at least a reader for reading data. NFC is a form of Radio Frequency Identification (RFID) with a short operating distance, typically requiring proximity of a few centimeters. For example, a reader in the second device can emit a short-range radio signal that when brought into close proximity to the first device can power a chip within a tag in the first device allowing the reader to read the small amount of data that is stored on that chip.

NFC services can include payment services, advertising services, and ticketing services. For example, an NFC-enabled device can be used to make a payment at a point-of-sale terminal, download a coupon from a display at a retailer, or add funds to a transportation ticket at a metro station. The availability of NFC services is often controlled by the operator of the service interface. For example, a retailer may operate a point-of-sale terminal to offer payment and coupon options for products in the retail outlet, and a transportation provider may operate a kiosk in a transportation terminal to offer ticketing options to users of that city's transportation systems. This type of control by the service interface operator can limit the proliferation of useful NFC services.

SUMMARY OF THE INVENTION

Disclosed herein are embodiments of methods and systems for making content elements available for use at a public computing kiosk.

One aspect of the disclosed embodiments is a method for making content elements available for use at a public computing kiosk operated by a first-party operator. The method includes receiving at the public computing kiosk a wireless communication from a hand-held device utilized by a second-party end user located in close physical proximity to the public computing kiosk. In this method the public computing kiosk includes a kiosk CPU and a kiosk memory and a kiosk display. The wireless communication includes information identifying a third-party provider of the hand-held device, and the third-party provider of the hand-held device and the first-party operator of the public computing kiosk are different entities. The method further includes authenticating the information identifying the third-party provider of the hand-held device, transmitting from the public computing kiosk to a computing system a request including at least a portion of the information identifying the third-party provider of the hand-held device, and receiving at the public computing kiosk a transmission from the computing system in response to the request. The transmission includes a set of content descriptors wherein at least one content descriptor corresponds to at least one content element and the set of content descriptors corresponding to the at least one content element are based on the information identifying the third-party provider. The method further includes displaying on the public computing kiosk the set of content descriptors to the second-party end user, accepting as input to the public computing kiosk selection of at least one content descriptor from the set of content descriptors by the second-party end user, executing at the public computing kiosk the at least one content element corresponding to the at least one content descriptor selected by the second-party end user, and displaying a result of the execution of the at least one content element to the second-party end user Another aspect of the disclosed embodiments is a system for making content elements available for use at a public computing kiosk operated by a first-party operator. The system includes a computing system including one or more system processors and system memory, a hand-held device including device memory, and a public computing kiosk configured to communicate with the computing system and with the hand-held device. The public computing kiosk includes a kiosk display visible to a second-party end user, a kiosk processor for controlling the operations of the public computing kiosk; and kiosk memory for storing data and program instructions used by the kiosk processor. The kiosk processor is configured to execute instructions stored in the kiosk memory to receive a wireless communication from the hand-held device utilized by the second-party end user located in close physical proximity to the public computing kiosk.

In this system, the wireless communication includes information identifying a third-party provider of the hand-held device, and the third-party provider of the hand-held device and the first-party operator of the public computing kiosk are different entities. The kiosk processor is further configured to authenticate the information identifying the third-party provider of the hand-held device, transmit from the public computing kiosk to the computing system a request including at least a portion of the information identifying the third-party provider of the hand-held device, and receive at the public computing kiosk a transmission from the computing system over the network in response to the request. The transmission includes a set of content descriptors wherein at least one content descriptor corresponds to at least one content element. The set of content descriptors corresponding to the at least one content element are based on the information identifying the third-party provider. The processor is further configured to display on the public computing kiosk the set of content descriptors to the second-party end user, accept as input to the public computing kiosk selection of at least one content descriptor from the set of content descriptors by the second-party end user, execute at the public computing kiosk the at least one content element corresponding to the at least one content descriptor selected by the second-party end user, and display a result of the execution of the at least one content element to the second-party end user.

These and other embodiments will be described in additional detail hereafter.

BRIEF DESCRIPTION OF THE DRAWINGS

The description herein makes reference to the accompanying drawings wherein like reference numerals refer to like parts throughout the several views, and wherein.

DETAILED DESCRIPTION OF THE ENABLING EMBODIMENTS

A first-party operator can install a public computing kiosk in a high-traffic, public area frequented by a plurality of second-party end users. The second-party end users can utilize hand-held devices issued by, manufactured by, or provided with operating systems by third-party providers. The hand-held devices can be NFC-enabled devices that will interact with the public computing kiosk when in close proximity with the public computing kiosk, allowing NFC services in the form of content elements to be offered at the public computing kiosk. The first-party operator and third-party provider of the hand-held device can be different entities, e.g. neither the same party nor parties tied together by a business relationship. With a first party operating the public computing kiosk and a third party providing the hand-held device, a greater variety of NFC services can be offered to second-party end users through the public computing kiosk.

For example, a public shopping mall may operate a public computing kiosk as a first-party operator. Mobile phone companies can issue NFC-enabled hand-held devices, mobile phones, to second-party end users, i.e., shoppers strolling through the shopping mall. The shoppers can bring the mobile phones in close proximity to the public computing kiosk and be offered a variety of NFC services in the form of content elements through a fourth-party application provider that has a relationship with the third-party provider of the given mobile phone. For example, an application marketplace such as Android Market by Google TM can be accessed with the public computing kiosk using a mobile telephone issued by a third-party provider such as Sprint, Verizon, or other issuers running the Android operating system. The NFC services available on the public computing kiosk are not chosen by the shopping mall. The public computing kiosk can display information relating to content elements offered by the fourth-party application provider, e.g. Android Market, thus encouraging broader proliferation of NFC services in public locations.

Figure 1:
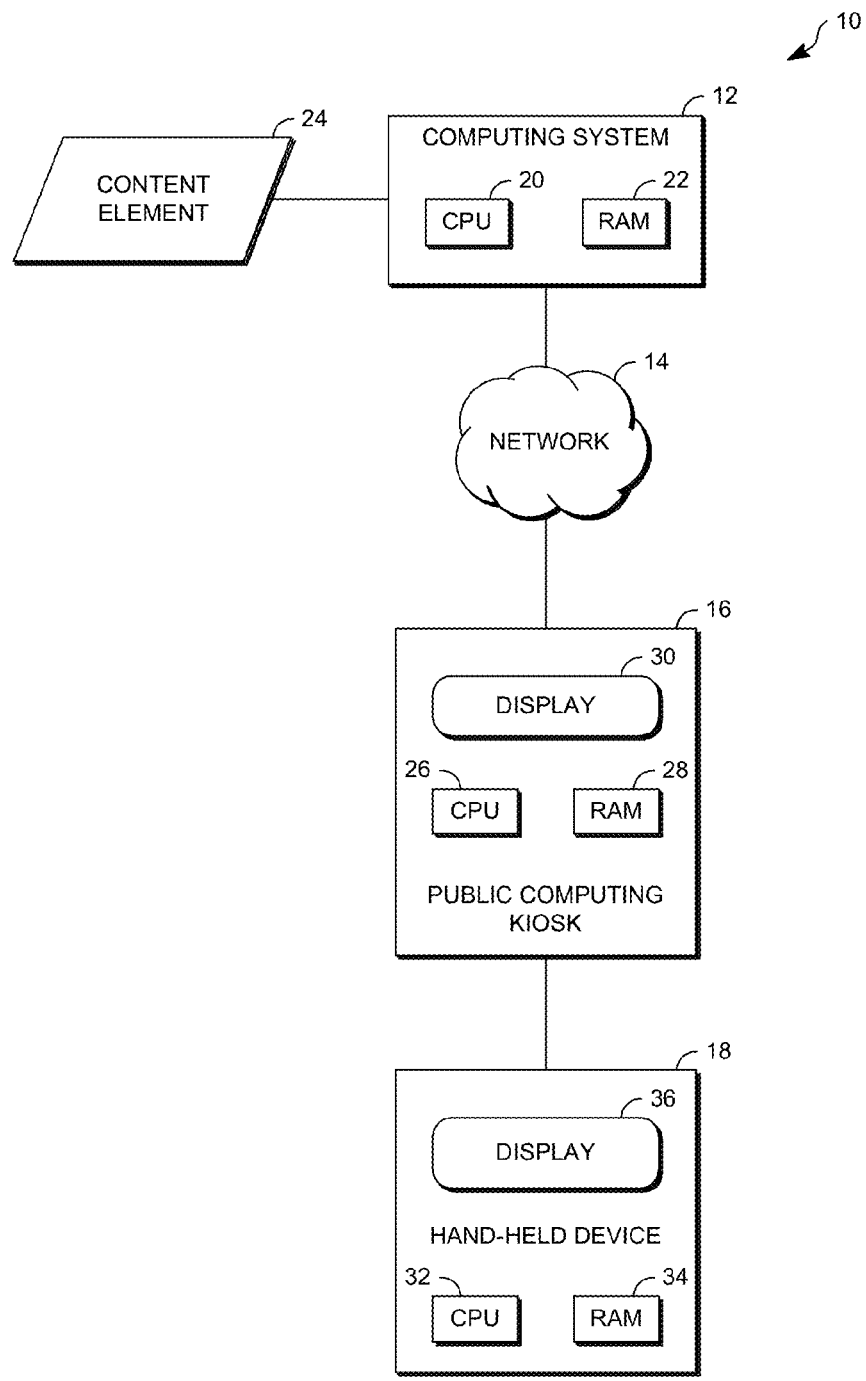
FIG. 1 is a block diagram of a system for making content elements available for use at a public computing kiosk.

FIG. 1 is a block diagram of a system 10 in accordance with one embodiment. The system 10 can include a computing system 12, a network 14, a public computing kiosk 16, and a hand-held device 18. The computing system 12 can be, for example, a server having an internal configuration of hardware including a processor such as a system central processing unit, system CPU 20, and a system memory 22. The system CPU 20 can be a controller for controlling the operations of the computing system 12. The system CPU 20 is connected to the system memory 22 by, for example, a memory bus. The system memory 22 can include random access memory (RAM) or any other suitable memory device. The system memory 22 can store data and program instructions which are used by the system CPU 20. Other suitable implementations of the computing system 12 are possible, including implementations with two or more processors carrying out the processing required for the computing system 12.

In one embodiment, content elements 24 are resident on or otherwise accessible to the computing system 12, for example, available through an application marketplace. The public computing kiosk 16 can communicate with the computing system 12 over the network 14 to request access to the content elements 24 including applications, games or other software, music, images, video, or any other type of software or data which an end user may wish to view and download to the public computing kiosk 16 over the network 14. All such applications, software, and data are referred to here generically as "content elements 24."

The network 14 couples the computing system 12 to the public computing kiosk 16 for transferring information regarding content elements 24 between the computing system 12 and the public computing kiosk 16. The network 14 can, for example, be the Internet. The network 14 can also be a local area network (LAN), wide area network (WAN), virtual private network (VPN), wireless local area network such as one based on the IEEE standards, or any other means of transferring information about the content elements 24 between the computing system 12 and the public computing kiosk 16. Communication between the public computing kiosk 16 and computing system 12 can also be based on any other suitable wireless standards such as 3G or 4G.

The public computing kiosk 16, in one example, can be a computer having an internal configuration of hardware including a kiosk CPU 26, a kiosk memory 28 such as RAM, and a kiosk display 30. The kiosk CPU 26 is a controller for controlling the operations of the public computing kiosk 16. The kiosk CPU 26 can be connected to the kiosk memory 28 by, for example, a memory bus. The kiosk memory 28 stores data and program instructions which are used by the kiosk CPU 26. Other suitable implementations of the public computing kiosk 16 are possible, including an interactive poster, a tablet, or an implementation with two or more processors carrying out the processing required for the public computing kiosk 16.

The kiosk display 30 is configured to present content elements 24 on the public computing kiosk 16 in a format suitable for visual review and selection by the end user. For example, the end user can view a set of content descriptors describing content elements 24 on the kiosk display 30. The end user can then choose specific content elements 24 by their content descriptors to execute on the public computing kiosk 16. Content descriptors can include content title, content description, and/or other pieces of information that can describe the nature of the content element 24. The kiosk display 30 may be implemented in various ways, including by a liquid crystal display (LCD) or a cathode-ray tube (CRT).

The public computing kiosk 16 can wirelessly communicate with the hand-held device 18 when, for example, the hand-held device 18 and public computing kiosk 16 are in close physical proximity supporting an NFC link between the hand-held device 18 and public computing kiosk 16. The hand-held device 18 can be a mobile device with a tag or tag emulator or NFC reader, or the hand-held device 18 can be a fixed device including an NFC tag, e.g., the hand-held device 18 can be either an NFC reader or an NFC tag. The public computing kiosk 16 can act as either an NFC reader or NFC tag depending on the configuration of the hand-held device 18 with which it communicates.

In the embodiment shown in FIG. 1, the hand-held device 18 is shown as a mobile device including one or more processors such as a device CPU 32, a device memory 34 such as RAM, and a device display 36. The device CPU 32 can control the operations of the hand-held device 18. The device CPU 32 can be connected to the device memory 34 by, for example, a memory bus. The device memory 34 stores data and program instructions which are used by the device CPU 32. The hand-held device 18 can be a laptop, notepad, personal digital assistant, tablet computer, mobile telephone, or other suitable mobile device. The hand-held device 18 in the FIG. 1 embodiment is a mobile telephone that is equipped with an NFC tag emulator which can communicate with the public computing kiosk 16 having an NFC reader.

Figure 2:
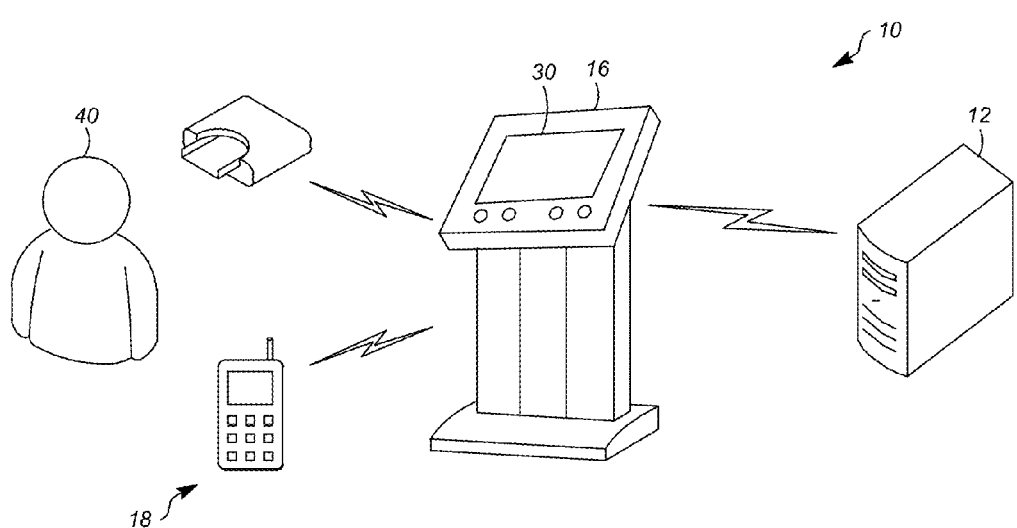
FIG. 2 is a schematic illustration of the use of the system depicted in FIG. 1.

FIG. 2 is a schematic illustration of the use of the system 10. A second-party end user 40 of a hand-held device 18 can bring the hand-held device 18 into close proximity with the public computing kiosk 16 operated by a first-party operator. The hand-held device 18 can wirelessly communicate with the public computing kiosk 16 via, for example, an NFC link between the hand-held device 18 and the public computing kiosk 16. The public computing kiosk 16 can couple to a computing system 12 such as a server to transfer information regarding NFC services in the form of a set of content descriptors describing content elements 24 between the server and the public computing kiosk 16.

In an exemplary embodiment, the first-party operator can be a shopping mall that installs a public computing kiosk 16 accessible to shoppers in the shopping mall. The second-party end users 40 can be the shoppers that use hand-held devices 18 such as mobile telephones. The mobile telephones can be NFC-enabled devices that will interact with the public computing kiosk 16 when in close proximity with the public computing kiosk 16, allowing NFC services to be offered at the public computing kiosk 16. The mobile telephones can be issued by third-party providers such as mobile telephone companies including companies such as Sprint or Verizon. When the shopper brings an NFC-enabled mobile telephone in close proximity to the public computing kiosk 16, the mobile telephone and public computing kiosk 16 can establish an NFC link.

Upon establishing the NFC link between the mobile telephone and public computing kiosk 16, the public computing kiosk 16 can send a request to a computing system 12 to authenticate the third-party provider of the mobile telephone to determine which NFC services can be offered to the shopper on the kiosk display 30 in the form of content descriptors of content elements 24. Delivery of NFC services to the shopper on the kiosk display 30 could involve the third-party provider of the shopper's mobile telephone partnering with a fourth-party application provider to display information in the form of content descriptors on the kiosk display 30. These content descriptors include information about the content elements 24 including such information as content title, content description, content maturity level, or information sharing capability of the content element 24.

In this example, the first-party operator, e.g. the shopping mall, and third-party provider of the hand-held device 18, e.g. Sprint or Verizon, are different parties. The shopping mall does not have influence over the NFC services available to the third-party provider, and the parties are not tied together by a business relationship. The shopping mall does not choose which NFC services in the form of content elements 24 will be available on the public computing kiosk 16. The identification of the mobile telephone issued by such third-party providers as Sprint or Verizon will determine which NFC services can be offered to the shopper on the public computing kiosk 16 after authentication of the mobile telephone at the computing system 12, such as a server in network 14 communication with the public computing kiosk 16.

In another embodiment, the first-party operator can be a city, e.g. San Francisco, installing a public computing kiosk 16 in a public park. The second-party end users 40 can be visitors that visit the public park and have hand-held devices 18 such as transportation smartcards. The transportation smartcards can be NFC-enabled devices that will interact with the public computing kiosk 16 when in close proximity with the public computing kiosk 16, allowing NFC services to be offered at the public computing kiosk 16. The transportation smartcards can be issued by third-party providers such as transit companies, for example, the San Francisco Municipal Transportation Agency (SFMTA). When the park visitor brings an NFC-enabled transportation smartcard in close proximity to the public computing kiosk 16 in the public park, the transportation smartcard and public computing kiosk 16 can establish an NFC link.

Upon establishing the NFC link between the transportation smartcard and public computing kiosk 16, the public computing kiosk 16 can send a request to a computing system 12, i.e. a server, to authenticate that SFMTA issued the transportation smartcard. Delivering NFC services to the visitor on the kiosk display 30 could include displaying a SFMTA application allowing park visitors to add funds to their transportation smartcards using the public computing kiosk 16 in the public park.

Figure 3:
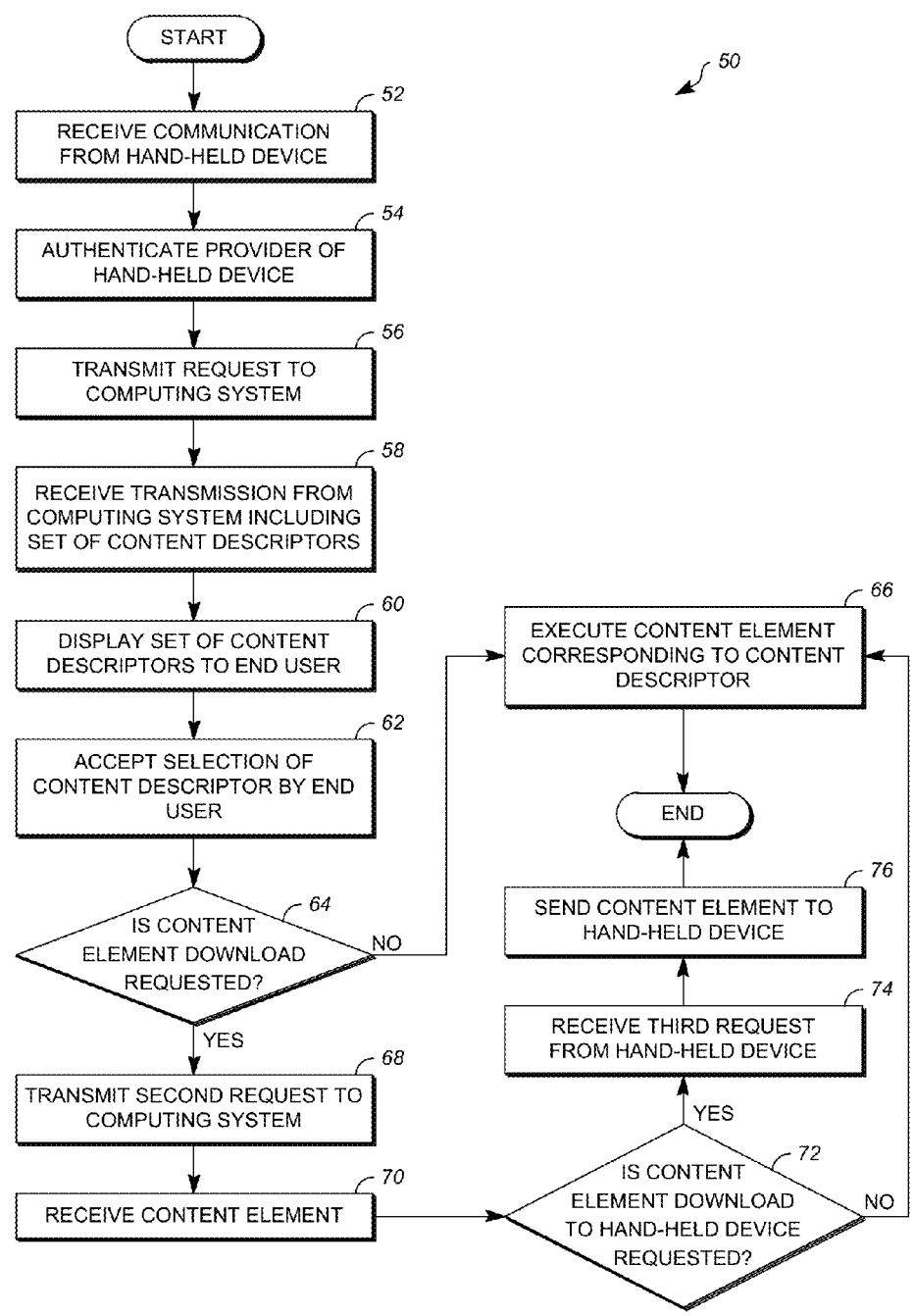
FIG. 3 is a logic flowchart of a process performed by the public computing kiosk in the system of FIG. 1.

FIG. 3 is a logic flowchart of a process 50 performed by the public computing kiosk 16 in the system 10 described above. Beginning at step 52, the public computing kiosk 16 operated by a first-party operator can receive a communication from the hand-held device 18 utilized by a second-party end user 40. The communication can include information identifying the third-party provider of the hand-held device 18. The communication can be an NFC wireless communication between an NFC reader in the public computing kiosk 16 and an NFC tag or NFC tag emulator in the hand-held device 18. To receive the NFC communication in this example, the hand-held device 18 must be placed in close proximity to the public computing kiosk 16, no further than a few centimeters. For example, the public computing kiosk 16 can determine the identity of the third-party provider of the hand-held device 18 using data stored on the NFC tag or NFC tag emulator on the hand-held device 18. The hand-held device 18 can be a transportation smartcard, laptop, notepad, personal digital assistant, tablet computer, mobile telephone, or other suitable mobile device capable of NFC wireless communication.

At step 54, the public computing kiosk 16 authenticates the information identifying the third-party provider of the hand-held device 18. For example, the public kiosk can determine based on the information provided by the hand-held device 18 which fourth-party application provider can be contacted to provide content elements 24 that are compatible with the hand-held device 18. The public computing kiosk 16 can also determine from the information identifying the third-party provider whether the communication received from the hand-held device 18 is authentic—that is, whether the request emanates from a hand-held device 18 authorized to view content elements 24 from a fourth-party application provider. For example, the public computing kiosk 16 can authenticate the third-party provider by requiring the second-party end user 40 to provide a password to request a set of content descriptors describing content elements 24 from a fourth-party application provider. Alternative or additional authentication mechanisms are also possible.

After the third-party provider of the hand-held device 18 is authenticated, the public computing kiosk 16 can transmit a request to the computing system 12 including at least a portion of the information identifying the third-party provider of the hand-held device 18 at step 56. The information identifying the third-party provider of the hand-held device 18 can support the public computing kiosk 16 in determining which entity, e.g. a fourth-party application provider, can receive a request to transmit a set of content descriptors describing content elements 24 to the public computing kiosk 16. For example, if the public computing kiosk 16 is operated by a shopping mall and the second-party end user 40 is a shopper with a mobile telephone issued by a third-party provider such as Sprint or Verizon, the fourth-party application provider can be Android Marketplace which can receive a request to transmit a set of application descriptions to the public computing kiosk 16 in the shopping mall after the public computing kiosk 16 identifies the Sprint or Verizon mobile telephone in close proximity to the public computing kiosk 16.

Once the request is transmitted to the computing system 12, the public computing kiosk 16 can receive a transmission from the computing system 12 in response to the request including a set of content descriptors describing content elements 24 at step 58. The transmission from the computing system 12 can be, for example, from the Android Marketplace to the public computing kiosk 16. The transmission from the computing system 12 can also be approved by the third-party provider of the hand-held device 18, i.e. Sprint or Verizon, before the transmission to the public computing kiosk 16 occurs. Approval by the third-party provider can be another method of authentication, for example, that the second-party end user 40 has valid access to view content elements 24 at the public computing kiosk 16.

After at least a set of content descriptors are received at the public computing kiosk 16, the public computing kiosk 16 can display the set of content descriptors to the second-party end user 40 at step 60. Displaying at least one content descriptor for each of the content elements 24 in the set of content elements 24 allows the second-party end user 40, i.e. a shopper with a mobile telephone, to review available content before selecting a content descriptor of a content element 24 to execute based on the content descriptor. After the set of content descriptors is displayed to the second-party end user 40 at the public computing kiosk 16, the public computing kiosk 16 can accept as input selection of at least one content descriptor from the set of content descriptors by the second-party end user 40 at step 62. The selection can be made by, for example, accepting touch inputs on a touch-screen display, accepting keyboard inputs, accepting a mouse click selection, or any other suitable means of accepting a selection on the public computing kiosk 16.

Once at least one content descriptor has been selected by the second-party end user 40, a determination is made as to whether a second request is made to transmit a copy of at least one content element 24 from the computing system 12 to the public computing kiosk 16 at decision block 64. For example, the second-party end user 40 can make a request at the public computing kiosk 16 to download a content element 24 to the public computing kiosk 16. If there is no second request to the computing system 12 to transmit a copy of at least one content element 24 to the public computing kiosk 16, the public computing kiosk 16 executes the at least one content element 24 corresponding to the at least one content descriptor selected by the second-party end user 40 at step 66, and the process 50 is complete.

If there is a second request to transmit a copy of at least one content element 24 from the computing system 12 to the public computing kiosk 16, the second request can be sent to the computing system 12 to download at least one content element 24 from the computing system 12 to the public computing kiosk 16 at step 68. The response to the second request is to receive the at least one content element 24 at the public computing kiosk 16 from the computing system 12 at step 70.

If the least content element 24 has been downloaded to the public computing kiosk 16, a determination is made as to whether a third request is made to transmit a copy of at least one content element 24 from the public computing kiosk 16 to the hand-held device 18 at decision block 72. For example, the hand-held device 18 can make a request to download a content element 24 from the public computing kiosk 16 if the hand-held device 18 is capable of running content elements 24. If there is no third request to the public computing kiosk 16 to transmit a copy of the at least one content element 24 to the hand-held device 18, the public computing kiosk 16 executes the at least one content element 24 corresponding to the at least one content descriptor selected by the second-party end user 40 at step 66, and the process 50 is complete.

If there is a third request to transmit a copy of the at least one content element 24 from the public computing kiosk 16 to the hand-held device 18, the third request can be received by the public computing kiosk 16 to transmit at least one content element 24 from the public computing kiosk 16 to the hand-held device 18 at step 74. The response to the third request is for the public computing kiosk 16 to send at least one content element 24 from the public computing kiosk 16 to the hand-held device 18 at step 76, and the process 50 is complete.

The embodiments of the public computing kiosk 16, hand-held device 18, and computing system 12 (and the algorithms, methods, instructions etc. stored thereon and/or executed thereby) can be realized in hardware including, for example, intellectual property (IP) cores, application-specific integrated circuits (ASICs), programmable logic arrays, optical processors, programmable logic controllers, microcode, firmware, microcontrollers, servers, microprocessors, digital signal processors or any other suitable circuit. In the claims, the term "processor" should be understood as encompassing any the foregoing, either singly or in combination. The terms "signal" and "data" are used interchangeably. Further, portions of server and client do not necessarily have to be implemented in the same manner.

In one embodiment, the public computing kiosk 16, hand-held device 18, and computing system 12 can be implemented using a general purpose computer/processor with a computer program that, when executed, carries out any of the respective methods, algorithms and/or instructions described herein. In addition or alternatively, for example, a special purpose computer/processor can be utilized which can contain specialized hardware for carrying out any of the methods, algorithms, or instructions described herein.

Further, all or a portion of embodiments of the present invention can take the form of a computer program product accessible from, for example, a non-transitory computer-usable or non-transitory computer-readable medium. A non-transitory computer-usable or non-transitory computer-readable medium can be any device that can, for example, tangibly contain, store, communicate, or transport the program for use by or in connection with any processor. The non-transitory medium can be, for example, an electronic device, a magnetic device, an optical device, an electromagnetic device, or a semiconductor device. Other suitable non-transitory mediums are also available.

The above-described embodiments have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for making content elements available for use at a public computing kiosk operated by a first-party operator, comprising:

receiving at the public computing kiosk a wireless communication from a hand-held device utilized by a second-party end user located in close physical proximity to the public computing kiosk, the wireless communication including authentication information associated with a third-party provider, wherein the hand-held device includes a near field communication (NFC) tag, the public computing kiosk includes an NFC reader for reading the NFC tag, a kiosk CPU, a kiosk memory, and a kiosk display, and the wireless communication is transmitted via an NFC link;

transmitting the authentication information from the public computing kiosk to the third party provider;

receiving, at the public computing kiosk from the third party provider subsequent to transmitting the authentication information, a transmission including at least one content element;

executing, at the public computing kiosk, the at least one content element; and displaying, at the public computing kiosk, a result of the execution of the at least one content element.

2. The method of claim 1, further comprising:

receiving, at the public computing kiosk from the hand-held device, a request to download the at least one content element from the public computing kiosk to the hand-held device; and sending the at least one content element from the public computing kiosk to the hand held device in response to the request to download the at least one content element.

3. The method of claim 1, wherein the content element is a software program.

4. The method of claim 1, wherein the third-party provider and the first-party operator are different entities.

5. The method of claim 1, wherein the wireless communication is transmitted via a near field communication link.

6. The method of claim 1, wherein the third party provider is a provider of the hand-held device.

7. A method for making content elements available for use at a public computing kiosk operated by a first-party operator, comprising:

receiving at the public computing kiosk a wireless communication from a hand-held device utilized by a second-party end user located in close physical proximity to the public computing kiosk, the wireless communication including authentication information associated with a third-party provider, wherein the hand-held device includes a near field communication (NFC) tag, the public computing kiosk includes an NFC reader for reading the NFC tag, a kiosk CPU, a kiosk memory, and a kiosk display, and the wireless communication is transmitted via an NFC link;

transmitting the authentication information from the public computing kiosk to the third party provider;

receiving, at the public computing kiosk from the third party provider subsequent to transmitting the authentication information, a first transmission including a set of content descriptors; and displaying, at the public computing kiosk, the set of content descriptors.

8. The method of claim 7, further comprising:

accepting, as input at the public computing kiosk, selection of at least one content descriptor from the set of content descriptors by the second-party end user;

transmitting information identifying the at least one content descriptor from the public computing kiosk to the third party provider; and receiving, at the public computing kiosk from the third party provider subsequent to transmitting information identifying the at least one content descriptor, at least one content element corresponding to the at least one content descriptor.

9. The method of claim 8, further comprising:

executing, at the public computing kiosk, the at least one content element.

10. The method of claim 9, further comprising:

displaying, at the public computing kiosk, a result of the execution of the at least one content element.

11. The method of claim 8, further comprising:

receiving, at the public computing kiosk from the hand-held device, a request to download the at least one content element from the public computing kiosk to the hand-held device; and sending the at least one content element from the public computing kiosk to the hand held device in response to the request to download the at least one content element.

12. The method of claim 7, wherein the content element is a software program.

13. The method of claim 7, wherein the third-party provider and the first-party operator are different entities.

14. The method of claim 7, wherein the wireless communication is transmitted via a near field communication link.

15. The method of claim 7, wherein the third party provider is a provider of the hand-held device.

16. A public computing kiosk operated by a first-party operator, comprising:

a kiosk memory containing program instructions;

a kiosk display;

a near field communication (NFC) reader for reading an NFC tag via an NFC link, wherein the NFC tag is associated with a hand-held device utilized by a second-party end user located in close physical proximity to the NFC reader; and a kiosk CPU operable to execute the program instructions from the kiosk memory, wherein the program instructions, when executed, cause the kiosk CPU to:

receive a wireless communication from the hand-held device, the wireless communication including authentication information associated with a third-party provider, transmit the authentication information to the third party provider, receive, from the third party provider subsequent to transmitting the authentication information, a transmission including at least one content element, execute the at least one content element, and display, at the kiosk display, a result of the execution of the at least one content element.

17. The public computing kiosk of claim 16, wherein the kiosk CPU is further operable to receive a request to download the at least one content element from the public computing kiosk to the hand-held device, and send the at least one content from the public computing kiosk to the hand held device in response to the request to download the at least one content element.

18. The public computing kiosk of claim 16, wherein the content element is a software program.

19. The public computing kiosk of claim 16, wherein the third-party provider and the first-party operator are different entities.

20. The public computing kiosk of claim 16, wherein the third party provider is a provider of the hand-held device.

* * * * *